United States Patent
Kwasniewski et al.

(10) Patent No.: US 8,449,280 B2
(45) Date of Patent: May 28, 2013

(54) CONTINUOUS MOTION NECK CALIBRATED WHEEL

(75) Inventors: Waldemar Boleslaw Kwasniewski, Feliksow (PL); Andrzej Tomasz Kowalczyk, Sulejowek (PL)

(73) Assignee: Graham Packaging Company, L.P., York, PA (US)

( * ) Notice: Subject to any disclaimer, the term of this patent is extended or adjusted under 35 U.S.C. 154(b) by 223 days.

(21) Appl. No.: 12/995,519

(22) PCT Filed: Mar. 13, 2010

(86) PCT No.: PCT/PL2010/050009
§ 371 (c)(1),
(2), (4) Date: Dec. 1, 2010

(87) PCT Pub. No.: WO2011/115511
PCT Pub. Date: Sep. 22, 2011

(65) Prior Publication Data
US 2012/0040037 A1    Feb. 16, 2012

(51) Int. Cl.
*B29C 49/28* (2006.01)
(52) U.S. Cl.
USPC ............ 425/150; 425/527; 425/534; 425/539
(58) Field of Classification Search
CPC ....................................................... B29C 49/28
USPC ......... 425/525, 527, 532, 533–536, 539–540, 425/140, 150
See application file for complete search history.

(56) References Cited

U.S. PATENT DOCUMENTS

| | | | | | |
|---|---|---|---|---|---|
| 2,230,190 | A | * | 1/1941 | Ferngren | 425/258 |
| 2,579,399 | A | * | 12/1951 | Ruckberg | 425/536 |
| 2,674,006 | A | * | 4/1954 | Bailey et al. | 425/532 |
| 3,479,690 | A | * | 11/1969 | Reinold | 425/163 |
| 3,546,747 | A | * | 12/1970 | Stefaniak et al. | 425/186 |

(Continued)

FOREIGN PATENT DOCUMENTS

| DE | 2 117 792 | 10/1972 |
|---|---|---|
| DE | 3434582 C1 * | 1/1986 |

(Continued)

OTHER PUBLICATIONS

Translation of DE 3434582 C (dated is not applicable).*

(Continued)

*Primary Examiner* — Dimple Bodawala
(74) *Attorney, Agent, or Firm* — Stradley Ronon Stevens & Young, LLP

(57) ABSTRACT

A machine (10) for blow molding containers (100). The machine (10) has a stationary flow head (26) located proximate a turntable (12) on which molds (16) are mounted. A dwell cam mechanism (110, 120, 132) on the turntable causes the molds to accelerate ahead of the turntable, stop under the flow head to receive a parison (31), then accelerate to catch up with the turntable. This sequence allows the turntable to rotate continuously. Blow pins (30) mounted on the turntable inject gas into the molds to blow mold the parison while traveling a first path (144). Paddles (142) grip the molded containers and travel a second path (146) radially outward from the first path. The containers blow-molded from the parisons at a first station (18) are retained on the turntable after the turntable completes one full revolution and again passes the first station.

18 Claims, 12 Drawing Sheets

U.S. PATENT DOCUMENTS

| | | | |
|---|---|---|---|
| 3,663,522 A * | 5/1972 | Butcher | 264/163 |
| 3,778,213 A * | 12/1973 | Di Settembrini | 425/532 |
| 3,860,104 A | 1/1975 | Strauss | |
| 3,890,081 A | 6/1975 | Grundmann | |
| 3,969,059 A | 7/1976 | Michel | |
| 4,718,845 A | 1/1988 | Sheffield et al. | |
| 4,723,906 A | 2/1988 | Gibbemeyer | |
| 4,801,260 A | 1/1989 | Oles et al. | |
| 4,861,542 A | 8/1989 | Shepps | |
| 4,874,281 A | 10/1989 | Bergerioux et al. | |
| 4,886,443 A | 12/1989 | Klinedinst et al. | |
| 5,118,276 A * | 6/1992 | Hashimoto | 425/289 |
| 5,486,103 A | 1/1996 | Meiting et al. | |
| 5,544,466 A | 8/1996 | Bonnet | |
| 5,556,648 A * | 9/1996 | Budzynski et al. | 425/150 |
| 5,597,433 A * | 1/1997 | Dyble et al. | 156/203 |
| 5,681,597 A * | 10/1997 | Aguilar et al. | 425/537 |
| 5,948,346 A | 9/1999 | Mills et al. | |
| 6,345,973 B1 * | 2/2002 | Nielsen | 425/145 |
| 6,555,033 B2 * | 4/2003 | Cargile et al. | 264/37.31 |
| 6,649,120 B1 | 11/2003 | Johnson | |
| 6,669,461 B1 * | 12/2003 | Taylor et al. | 425/537 |
| 6,692,686 B1 | 2/2004 | Gonda et al. | |
| 7,101,506 B1 * | 9/2006 | Taylor et al. | 264/543 |
| 7,407,376 B2 * | 8/2008 | Steele | 425/352 |
| 7,621,738 B2 * | 11/2009 | Doudement | 425/534 |
| 7,857,614 B2 * | 12/2010 | Di Simone | 425/528 |
| 8,075,834 B2 * | 12/2011 | Kwasniewski et al. | 264/538 |
| 2002/0086083 A1 | 7/2002 | Singleton | |
| 2004/0185134 A1 * | 9/2004 | Fiorani et al. | 425/537 |
| 2005/0248054 A1 * | 11/2005 | Bates et al. | 264/237 |
| 2006/0099294 A1 | 5/2006 | Netsu | |
| 2010/0225033 A1 * | 9/2010 | Kwasniewski et al. | 264/572 |
| 2012/0003349 A1 * | 1/2012 | Woinski | 425/537 |

FOREIGN PATENT DOCUMENTS

| | | |
|---|---|---|
| DE | 20 2006 004 641 U1 | 8/2007 |
| FR | 2 070 321 | 9/1971 |
| JP | 53 129255 | 11/1978 |
| WO | WO 2009/059091 | 5/2009 |

OTHER PUBLICATIONS

Partial International Search Report from International Application No. PCT/PL2010/050009 issued by the EPO on Mar. 30, 2011.
International Search Report from International Application No. PCT/PL2010/050009 issued by the EPO on Jul. 18, 2011.
Extended European Search Report from application No. 12 16 0329 issued by the EPO on Aug. 22, 2012.

* cited by examiner

CONTINUOUS MOTION NECK CALIBRATED WHEEL

This application is a U.S. national phase application of International Application No. PCT/PL2010/050009 filed on 13 Mar. 2010.

FIELD OF THE INVENTION

The present invention relates generally to machines for manufacturing hollow articles from thermoplastic materials by blow molding and, more particularly, to horizontal rotary blow-molding machines.

BACKGROUND OF THE INVENTION

Blow molding is a fabrication method for hollow thermoplastic shapes. There are two general classes of plastic products made using the blow-molding process and related machinery: packaging products and technical parts. Packaging products include such items as bottles, jars, jugs, cans, and other containers. Technical parts include automotive components such as bumpers, fuel tanks, functional fluid containers, ducting, and the like.

The blow-molding process can be of two general types: extrusion blow molding and injection blow molding. In extrusion blow molding, a thermoplastic parison is lowered from an extruder and between mold halves. The mold halves close around the parison, and the parison is then expanded against a mold cavity by introduction of a blowing gas, usually air. In injection molding, a thermoplastic material is first injection molded into a preform parison which is then transferred to a blow mold and expanded in the same manner as in an extrusion blow-molding process.

In intermittent extrusion, the molds are mounted to a common platen and the parisons are extruded by either a reciprocating screw extruder or by a ram accumulator which holds in readiness a volume of molten plastic material needed to make the next part or parts. In continuous extrusion, a molten parison is produced from an extruder die without interruption, and a segment of the parison is severed and positioned into a mold. The molds can be moved from station to station on rotating vertical wheels, on a rotating horizontal table, or with a reciprocating action. When the parison is extruded, the mold is moved under the extruder die or flow head to receive the parison segment and then is moved to a blowing station.

The positioning of the parison relative to the mold in a rotary system is relatively difficult. Therefore, many of the current blow-molding machines use the reciprocating mold concept according to which the molds are shuttled back and forth from station to station. A major drawback of the reciprocating mold concept, however, is a limitation on production rate.

A. Shuttle Machinery

Shuttle machines are either single-sided or dual-sided machines, and can be manufactured to produce one- to six-layer containers. In a single-sided machine, the mold "shuttles" under the flow head, closes to capture the parisons, then moves away from the flow head. Blow pins are then forced downward into the molds, helping to "calibrate" the necks while air is forced into the cavity to blow the container. The shuttle motion allows the bottles to be blown and cooled to the side, without interfering with the parisons, which are continually extruding from the flow head. In a double-sided shuttle machine, there is a mold on each side of the flow head, one shuttling to the right and one to the left, which generally doubles the output of a single-sided machine.

Shuttle machines may extrude single or multiple parisons, and are characterized by the number of parisons and the horizontal spacing between the parisons. For example, a "4×100" shuttle extrudes four parisons, spaced 100 mm between the centers. This would require a platen (for attaching the molds) greater in size than 400 mm, to accommodate the required mold width. The horizontal or angled shuttling distance is thus greater than 400 mm for a 4×100 shuttle machine. In general, shuttle machines up to 2×100 mm spacing are considered small machines; shuttles up to 6×100 mm spacing are considered mid-sized machines; and shuttles larger than this are typically referred to as "long-stroke" machines. Shuttle machinery is used widely in the production of personal care bottles, medical bottles, and some small industrial containers.

The steps required for a shuttle machine to blow mold a hollow plastic object can be described by the following sequence of operations. First, as the dropping parisons approach the length of the object to be blown, the mold, in an open position, shuttles sideways to a point directly under the flow head of the machine. The molds then close to capture the parison. A knife cuts the parisons directly above the molds. The knife may be either a cold knife (cutting with a sharp edge) or a hot knife (burning through the parison).

The molds shuttle away from the flow head until they are directly under the blow pin stations. If the mold movement is horizontal, the extruder head is made to bob up vertically, so that the continuously extruding parisons do not drag against the mold as it moves sideways. In some shuttle machinery, the molds shuttle down at an angle, eliminating the need for the head and extruders to bob upwards. The blow pins are forced down into the still-open necks of the containers, calibrating the necks of the containers. In most cases, the blow pins punch down onto striker plates, which form the top edge of the neck to a precise flat dimension. Air pressure is applied to blow the containers. In many cases, the blow air is turned on before the blow pins enter the open neck of the parison, to force the plastic outward and ensure a good neck formation.

After the containers have cooled, the molds open, and again shuttle under the flow head of the machine. As the molds close on the molten parisons, masking stations that are attached to the sides of the mold close over the outside of the previously blown containers, which are still held in place by the blow pins. The blow pins retract, leaving the containers held only by the masks. As the molds again shuttle sideways, the masks transfer the formed containers sideways to a punching station. Punches come forward to remove the tails, top moil, and any handle (grip) slugs away from the bottles. The bottles are then conveyed out of the machine. This may be done by transferring the bottles onto conveyor belts, by take-out devices, or by simply dropping the bottles into a chute or onto a takeaway conveyor.

Shuttle blow molding equipment offers the following advantages: (1) relative low cost compared to other extrusion blow molding machinery; (2) capable of producing a high-quality "calibrated neck" finish with blow pins; (3) in-machine trimming so that finished bottles exit the machine; (4) capable of producing bottles of all shapes, including handle ware; (5) co-extrusion capability, with up to six layers of plastic. On the other hand, shuttle machines have some limitations. Among those limitations are: (1) not cost effective for extremely high volumes; (2) reduced bottle weight consistency compared to rotary wheel machinery, due to inevitable variations among the number of unique parisons that must be extruded in shuttle equipment; (3) cycle time disadvantage when compared to reciprocating screw machines and rotary wheel machines, particularly when producing light-weight containers; and (4) complexity of the hydraulic and control systems.

B. Indexing Machinery

Horizontal rotary blow-molding machines index circumferentially spaced mold halves in steps around a vertical axis. The mold halves each capture a vertical, continuously growing parison at an extrusion station. In one machine, the flow head extruding the parison moves up away from the mold halves after the mold halves close to capture the parison. The parison is severed adjacent the top of the mold halves, the mold halves are moved away from the extrusion station, and a top blow pin is moved into the end of the captured parison at the top of the mold halves to seal the mold cavity and blow the parison. Subsequently, the flow head and dependent parison are lowered back to the initial position so that the new parison is in position to be captured by the next pair of mold halves. The blown parison cools as the mold halves are rotated around the machine, following which the mold halves open at an ejection station and the finished article, commonly a bottle, is ejected from between the mold halves. The machine includes an in-mold labeling station between the ejection station and the extrusion station for applying labels to the interior surfaces of the mold cavities.

Blowing of the captured parison is delayed until after the mold is moved away from the flow head and the blow pin has been moved into engagement with the top of the held parison. This interval of time increases the cycle time for the machine. A mechanism is required to raise and lower the flow head. Moving the flow head may move the growing parison with the ever-present risk that this movement will cause the end of the long, growing parison to shift laterally, thereby increasing the risk that the parison is not properly aligned when captured in the mold cavity.

When blow molding bottles using a blow pin entering the cavity at the top of the mold, there is a risk that the molten parison resin will gravity-flow down from the top of the cavity before the pin is extended into the cavity and confines the top of the parison against the cavity mouth. This risk is increased in a machine where the captured parison must be moved a distance away from the flow head before the blow pin is inserted down into the mouth at the top of the mold.

In another horizontal rotary blow-molding machine the parison grows down over a blow pin at the bottom of the mold halves before closing of the mold halves. The flow head is moved up above the closed mold before severing of the new parison from the captured parison. The mold is then indexed laterally to the next station without dropping and the captured parison is blown within the cavity. In a further horizontal rotary blow-molding machine, the whole turntable supporting all of the mold halves is raised and lowered during rotation as each mold captures a parison at the extrusion station.

Although horizontal rotary blow-molding machines allow for high production rates of uniform containers, there are disadvantages in the various mechanisms which, if eliminated, will result in more reliable production of high quality containers. One such problem involves the moving flow head. The parison acts as a pendulum as it dangles beneath the flow head while it is being extruded. The knives which sever the parison portion from the parison and the clamp which pinches and seals the parison cause the parison to swing when they disengage from it. Motion of the flow head tends to amplify the swinging motion of the parison, which can lead to irregularities and flaws in the containers as the mold halves close on a parison portion that is in a different position and orientation from one mold to the next.

Mold closing also affects the quality of the molded container. It is important that the molds close in precise alignment consistently and maintain the precise alignment throughout the molding process. The molds must withstand significant internal pressure without shifting or parting to ensure a quality container with the requisite uniformity of production.

Mold cooling also affects the container production. The longer the cooling time, the less likely a container will be damaged during handling upon removal from a mold. Increased cooling time must be weighed against a decrease in output, however, and it would be advantageous if longer cooling time could be realized without adversely affecting the machine output. It would also be advantageous to provide a handling mechanism for removing containers from molds which is gentle and will not damage the container when it is most vulnerable during cooling.

To overcome the shortcomings of conventional blow-molding machines, a new continuous motion neck calibrated wheel is provided. In view of the relatively large commercial demand for various types of plastic articles, it would be desirable to have a blow-molding machine that can produce high-quality articles at a relatively low cost. The present invention satisfies this desire.

An object of the present invention is to provide an improved continuous-motion blow-molding machine capable of neck calibration that is based on a wheel concept distinguished from conventional indexing or shuttle type technology. A related object is to avoid the problems encountered with conventional attempts to run neck calibrated machines continuously, capturing the parison in molds and removing containers from the molds. Another object is to overcome the relatively low output of conventional machines by producing neck calibrated containers with relatively high output.

It is still another object of the present invention to avoid start-and-stop, or indexing, of the wheel from station to station which reduces cycle time and induces stress on the components of the machine. A related object is to provide a turntable that rotates continuously, without stopping, around an endless circle. An additional object is to provide a control system that coordinates and controls operation of the various elements of the machine.

Yet another object of this invention is to retain the formed containers on the machine beyond the initial 360 degrees first tour of rotation. A related object is to use the additional time during which the containers are retained on the machine usefully, such as to add features that perform further operations on the containers. Another related object is to provide a blow pin path separate from a container path, enabling the machine to blow-mold and cool containers while further operations are completed on already-formed containers.

SUMMARY OF THE INVENTION

To achieve these and other objects, to meet these and other needs and desires, and in view of its purposes, the present invention provides a machine for blow-molding containers from a parison. The machine has a turntable continuously rotating about an axis of rotation in an endless circle without stopping. A flow head forms and provides the parison and is fixedly positioned at a first station of the machine proximate the turntable. A plurality of molds are carried by the turntable to position each of the molds adjacent the flow head in turn, each mold including mold portions which are movable between an open configuration to receive the parison from the flow head and a closed configuration to mold the parison.

According to one embodiment of the invention, the machine further has a dwell cam mechanism located on the turntable. The dwell cam mechanism initially accelerates each mold in turn from an initial location relative to the turntable as the mold approaches the first station to position the mold adjacent the flow head, stops the mold adjacent the flow head while the mold receives the parison and the turntable continues to rotate, then finally accelerates the mold relative to the turntable as the mold leaves the first station to position the mold at its initial location relative to the turntable.

According to another embodiment of the invention, the machine further has a plurality of blow pins mounted on the turntable. At least one blow pin is positioned adjacent to each of the molds. The blow pins engage the molds when in the closed configuration for injecting compressed gas into the molds to effect blow molding of the parison. The blow pins travel a blow pin path while blow-molding the containers from the parisons. Paddles grip the blow-molded containers after the containers have been blow-molded from the parisons. The paddles travel a container path while gripping the blow-molded containers. The container path is positioned radially outward from, and further from the axis of rotation than, the blow pin path.

According to still another embodiment of the invention, the container blow-molded from the parison received from the flow head at the first station is retained on the turntable after the turntable completes one full revolution and again passes the first station. Such additional retention allows the machine to include at least one additional, non-molding feature. The additional feature can be a vacuum, a chute, a de-flasher, a leak-detection unit, a labeling device, or the like. The additional feature engages the blow-molded container after the blow-molded container has been retained on the turntable beyond one full revolution.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying figures. It is emphasized that, according to common practice, the various features of the figures are not to scale. On the contrary, the dimensions of the various features are arbitrarily expanded or reduced for clarity. Included in the drawing are the following figures.

DETAILED DESCRIPTION OF THE EMBODIMENTS

The present invention represents an improvement upon the invention disclosed in International Publication No. WO 2009/059091, which is based upon International Application No. PCT/US2008/081932 filed by the assignee of the present application. That International Publication is incorporated by reference in this application in its entirety.

Figure 1:
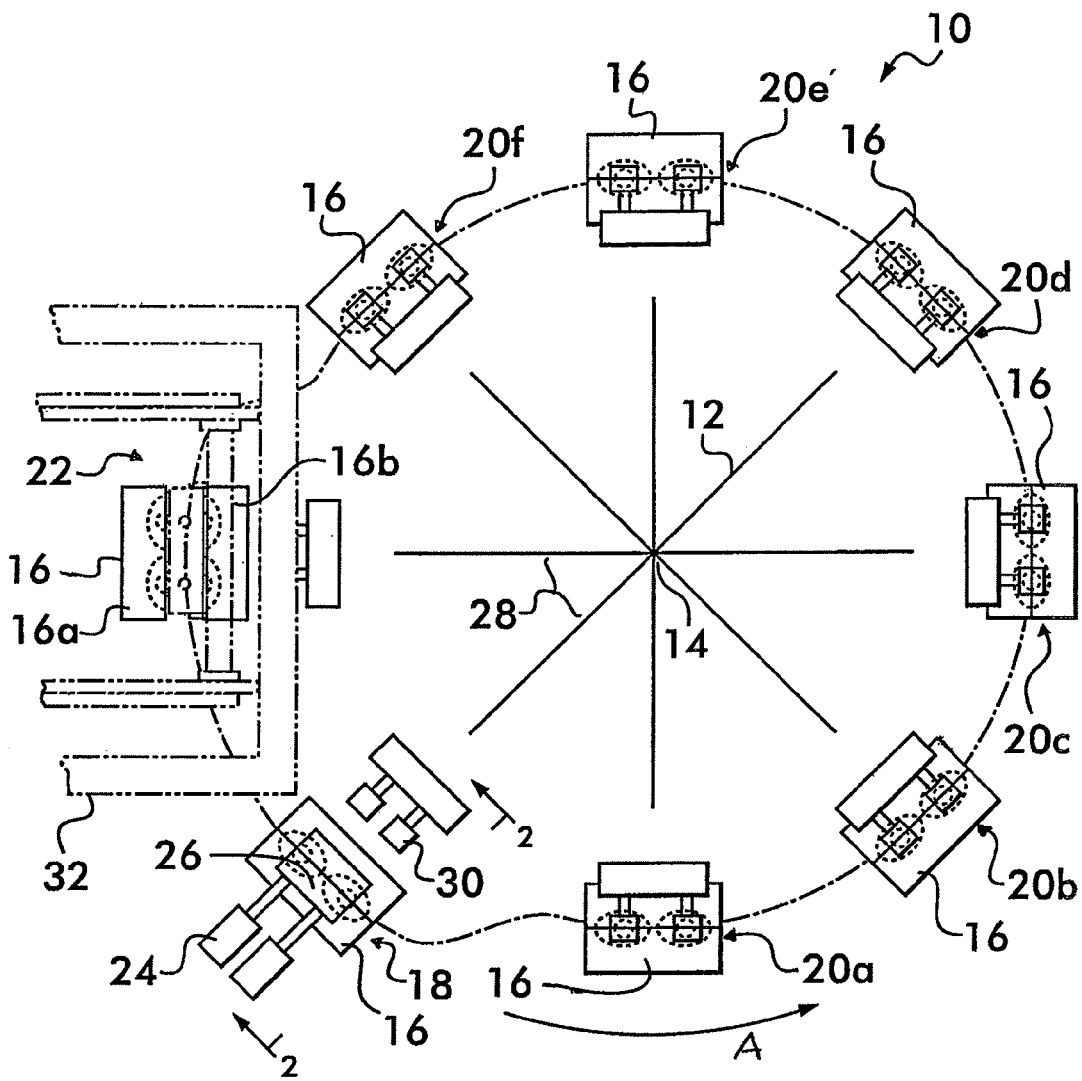
FIG. 1 is a schematic plan view of several of the basic components of an exemplary blow-molding machine according to the present invention.

Referring now to the drawing, in which like reference numbers refer to like elements throughout the various figures that comprise the drawing, FIG. 1 shows a schematic plan view of several of the basic components of an exemplary blow molding machine 10 according to the invention. The machine 10 includes a turntable 12 rotatable by an electric motor (not shown) about an axis of rotation 14. Preferably, the turntable 12 is oriented horizontally (in the x-y plane) and the axis of rotation 14 is substantially vertical (along the z-direction).

One or more molds 16 are mounted on the turntable 12. Counterclockwise rotation of the turntable 12, in the direction of arrow A in FIG. 1, positions each mold 16 successively at a plurality of stations. Among the stations are a first station 18; a plurality of intermediate stations including second station 20a, third station 20b, fourth station 20c, fifth station 20d, sixth station 20e, and seventh station 20f; and a last station 22. The number of stations is equal to the number of molds 16 on the turntable 12, eight in the example illustrated, although more or fewer stations are feasible. Each mold 16 has two mold halves 16a and 16b which can be moved between an open configuration, as shown at the last station 22, and a closed configuration, shown at the first station 18 and the intermediate stations 20a-20f.

The machine 10 also includes an extruder 24 which feeds molten polymer resin to a flow head 26 positioned at the first station 18. Although a wide variety of plastic resin materials can be used, including polypropylene, polyvinylchloride (PVC), and polycarbonate, a preferred material is polyethylene terephthalate (PET). The flow head 26 is advantageously stationary, meaning that the flow head 26 is fixed in a single, constant position at all times. Preferably, the flow head 26 is positioned above the turntable 12.

The first station 18 is positioned at a predetermined angle 28 relative to the last station 22 as measured with respect to the turntable axis of rotation 14. By "predetermined" is meant determined beforehand, so that the predetermined angle 28 must be determined, i.e., chosen or at least known, before the machine 10 is used. For the example configuration shown in FIG. 1, for which eight stations are provided, the predetermined angle 28 is preferably an acute angle of about 45 degrees. This relative positioning is advantageous because it provides increased cooling time for a molded container 100 (see FIG. 10) as it traverses the large remaining angle (315° in the illustrated example) occupied by the intermediate stations 20a-20f and the last station 22 before being released from the mold 16 at the last station 22.

The machine 10 also includes a plurality of blow pins 30 mounted on the turntable 12. The blow pins 30 cooperate with each of the molds 16 to form a calibrated neck on the container 10 and inject compressed gas into a parison 31 received within the mold 16 to conform the parison 31 to the shape of the mold 16 as described below. The parison 31 is a hollow tube of molten polymer resin that is extruded continuously from the flow head 26. The dimensions of the calibrated neck are held to relatively high precision and close tolerances. A container takeout device 32 is positioned at one of the stations (as illustrated in FIG. 1, the takeout station may be the last station 22) for removing containers 100 from the mold 16 after they have cooled and for transporting the containers 100 for further processing, such as de-flashing.

Figure 2:
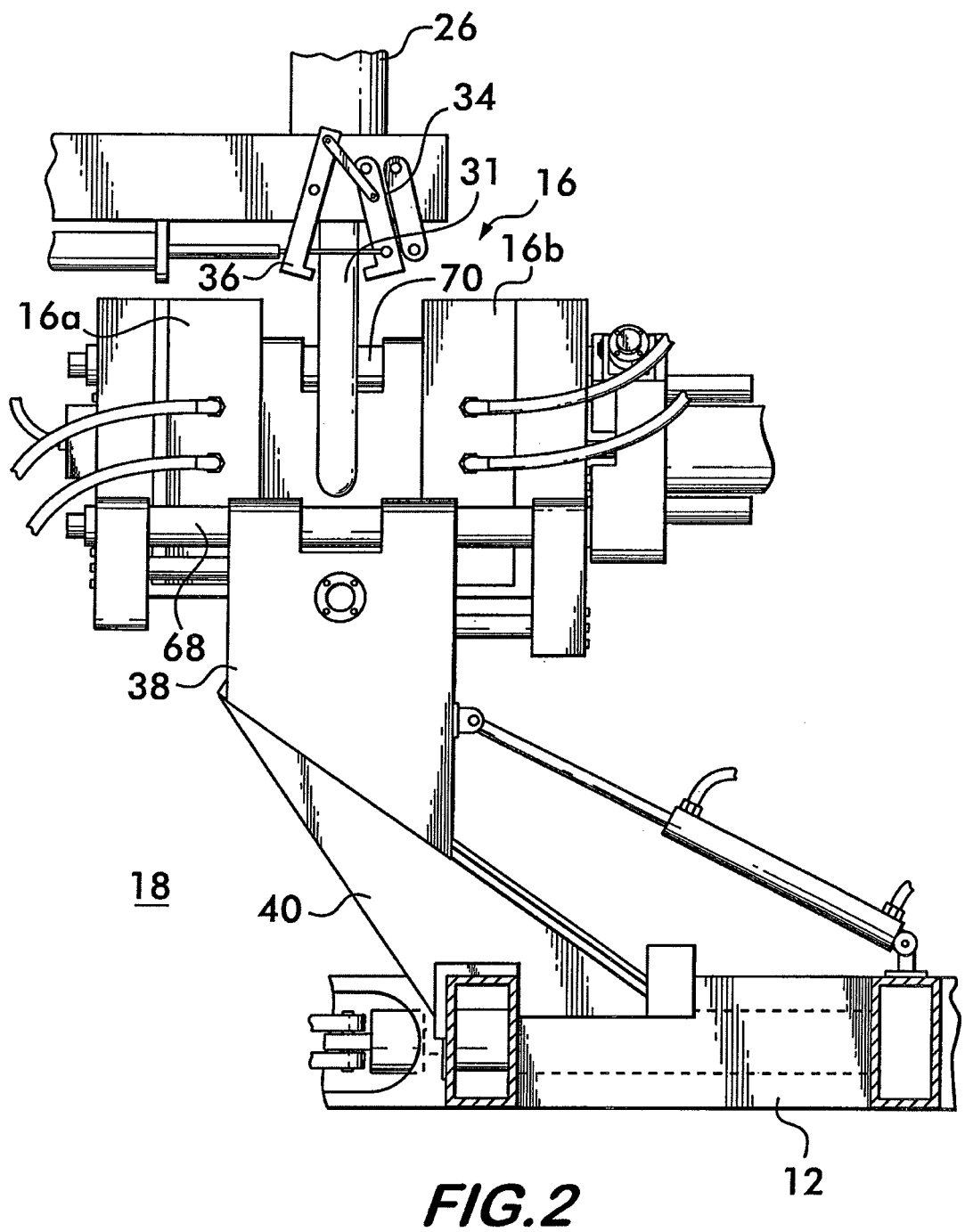
FIG. 2 is a side view of the flow head, carriage, and mold of the machine taken along the line 2-2 of FIG. 1.

The first station 18 is shown in detail in FIG. 2. One of the molds 16 is shown in the open configuration, with mold halves 16a and 16b separated, to receive the molten resin parison 31 as it is continuously extruded from the flow head 26. A cutter 34 is located adjacent to the flow head 26 for separating a parison portion from the parison 31 upon closing of the mold 16. A clamp 36 operates to pinch the end of the extruding parison 31 and seal the end so as to allow the parison 31 to be inflated, preventing the parison 31 from folding in on itself and collapsing as it is extruded from the flow head 26.

In the machine 10, according to the invention, the flow head 26 is fixedly positioned at the first station 18 and does not move vertically to feed the parison 31 to the molds 16. The parison 31 is suspended beneath the flow head 26 and tends to swing like a pendulum if disturbed. Some parison motion is caused by the action of the cutter 34 and the clamp 36 and is unavoidable. It is advantageous to minimize disturbances to the parison 31 as it is extruded beneath the flow head 26 and to allow any motion to damp out so that the parison 31 enters each mold 16 in substantially the same orientation and position to ensure consistency and quality of the containers 100. To this end, it is advantageous to extrude the parison 31 from a stationary flow head 26, thereby eliminating a source of disturbance which would otherwise cause unwanted parison motion.

Figure 3:
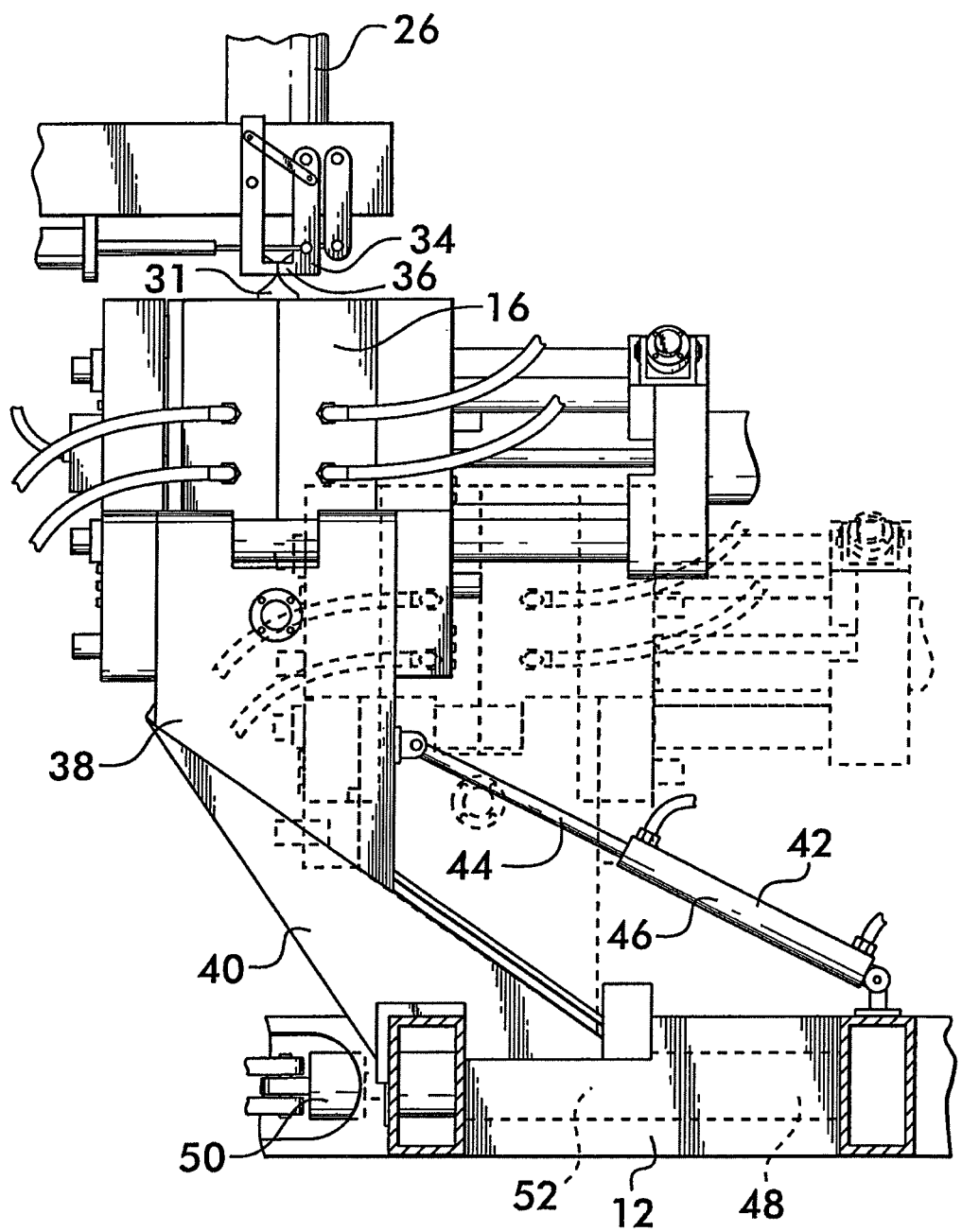
FIG. 3 is a side view illustrating motion of the carriage shown in FIG. 2 along a first cam track.

In order to present the molds 16 to the stationary flow head 26, each mold 16 is mounted on a respective carriage 38 which is movably mounted on a respective inclined ramp 40. The inclined ramps 40 are mounted on the turntable 12, as best shown in FIG. 2, and preferably face radially outward away from the axis of rotation 14. As shown in FIG. 3, each carriage 38 is moved by a first (or lifting) cam mechanism between a first, lower position (shown in phantom line) and a second, raised position above the first position to facilitate acquisition of the parison 31 by the mold 16 during operation of the machine 10. The containers 100 can also be removed from the mold 16 when in this second position.

Motion of the carriage 38 along the ramp 40 is preferably effected by a first actuator 42 (which may be a hydraulic actuator) mounted on the turntable 12. The first actuator 42 is preferably a piston 44 movable within a cylinder 46. The first actuator 42 is connected (preferably hydraulically) to a second actuator 48 (which also may be a hydraulic actuator) mounted on the turntable 12. The second actuator 48 also preferably includes a piston 50 movable within a cylinder 52. Although the first actuator 42 and the second actuator 48 are preferably hydraulic, they could be pneumatic, electro-mechanical, or another type of device as would be evident to an artisan.

Figure 4:
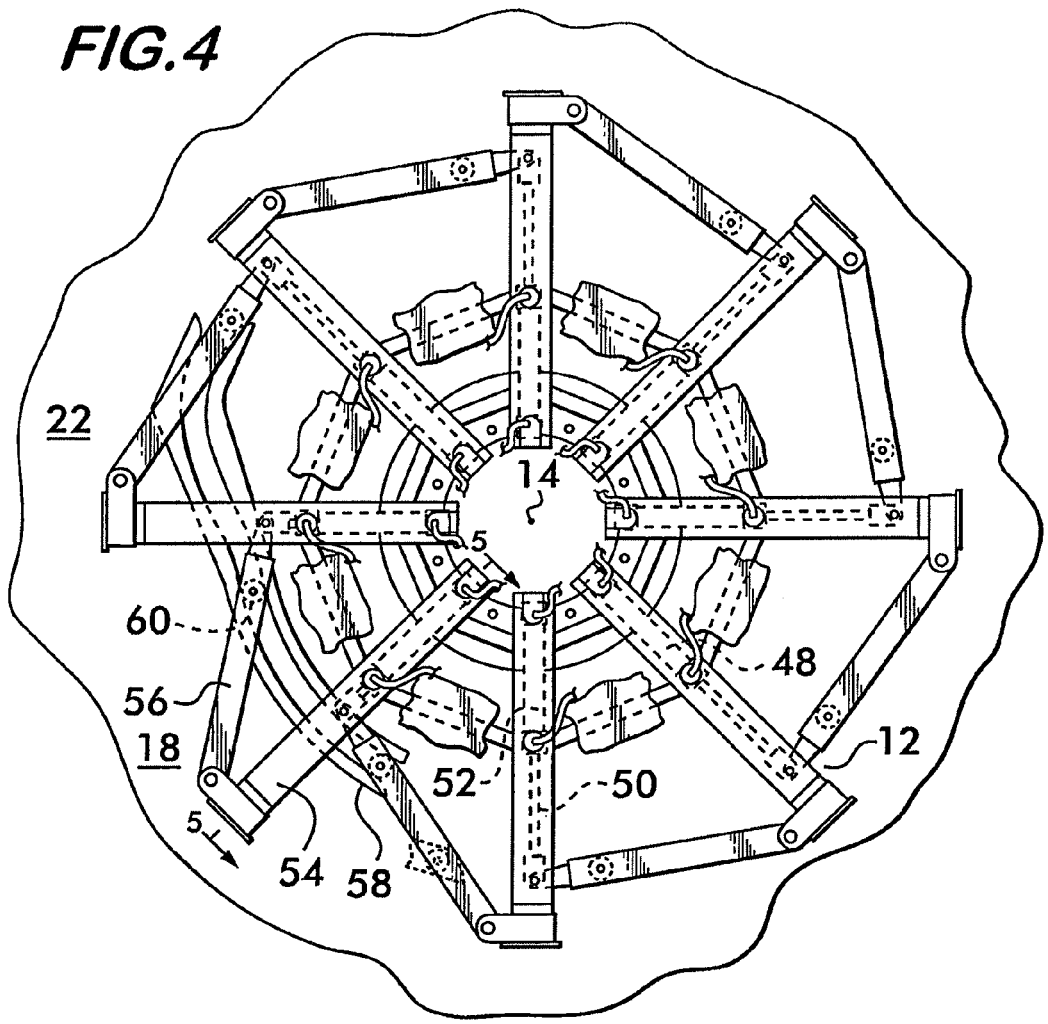
FIG. 4 is a partial plan view of a turntable used on the machine shown in FIG. 1.
Figure 5:
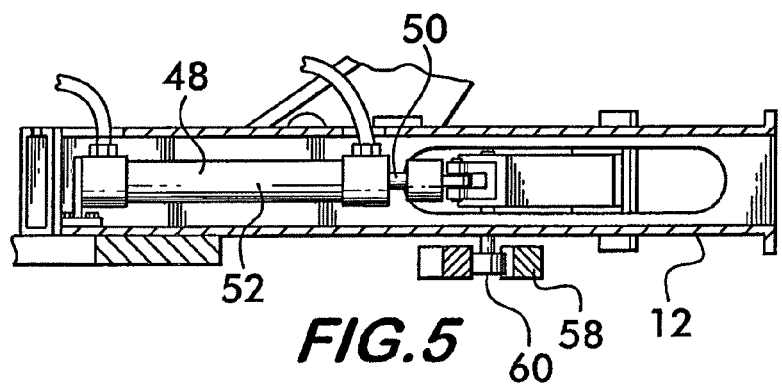
FIG. 5 is a cross-sectional view taken along the line 5-5 of FIG. 4.

The actuators 42 and 48 are hydraulically connected to one another in a closed loop such that actuation of the second actuator 48 causes actuation of the first actuator 42 and vice versa, thereby effecting motion of the carriage 38 up and down the inclined ramp 40. Note that no hydraulic pump or fluid reservoir is required for this system. A specific example of this arrangement is shown schematically in FIGS. 6 and 7, which simultaneously show a plan view of a portion of the turntable 12 and a side view of the carriage 38 and the inclined ramp 40 for clarity of explanation, it being understood that the actual relative orientation of these components is as depicted in FIGS. 3, 4, and 5.

Figure 6:
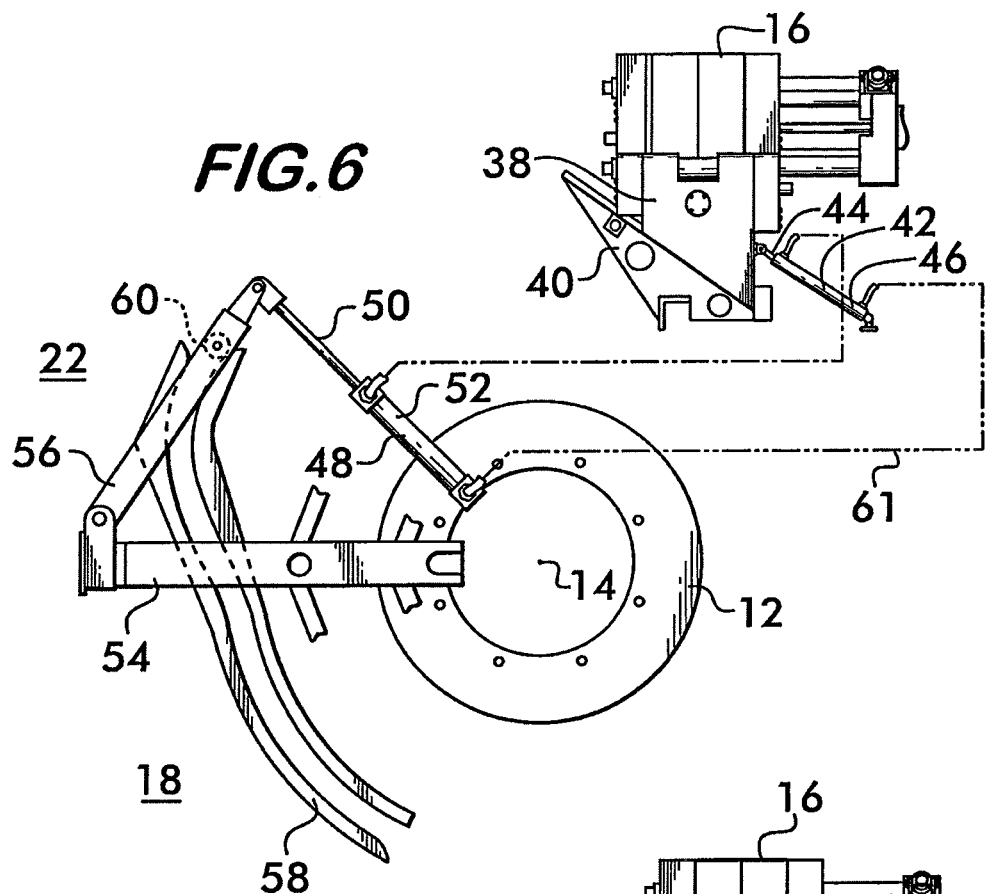
FIGS. 6 and 7 are schematic views illustrating the operation of the first cam and hydraulic mechanism for raising and lowering the carriage shown in FIG. 2.

As shown in FIG. 6, a fixed arm 54 is mounted on the turntable 12 and a pivoting arm 56 is pivotably mounted on the end of the fixed arm 54. The piston 50 of the second actuator 48 is pivotably attached to the end of the pivoting arm 56 so that motion of the pivoting arm 56 moves the piston 50 within its respective cylinder 52, thereby actuating the second actuator 48. Motion of the pivoting arm 56 is controlled by a first cam track 58 of the first cam mechanism which is positioned adjacent to the first station 18 and may be positioned (if desired) adjacent to the last station 22.

Figure 7:
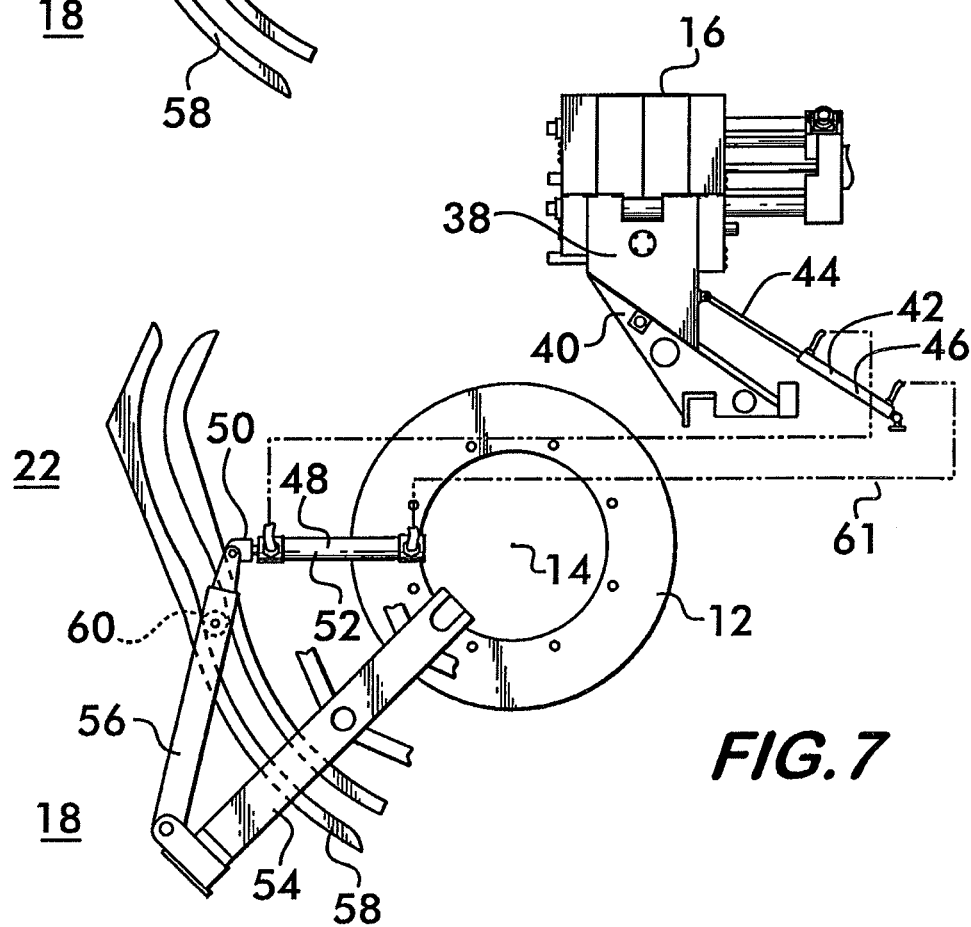

A cam follower of the first cam mechanism, in this example comprising a pin 60, projects from the pivoting arm 56 and engages the first cam track 58 as the turntable 12 rotates the mold 16 through the first station 18 (and, if desired, through the last station 22). As shown in FIG. 7, as the pin 60 traverses the first cam track 58, the shape of the cam track 58 forces the pivoting arm 56 inwardly toward the axis of rotation 14 of the turntable 12. This action forces the piston 50 inwardly of its cylinder 52. The cylinder 52 is hydraulically connected to the cylinder 46 by hydraulic lines 61 such that inward motion of the piston 50 forces the piston 44 of the first actuator 42 outwardly from its cylinder 46, thereby moving the carriage 38 up along the inclined plane of the ramp 40 to the raised position depicted in FIG. 7.

The carriage 38 is maintained in this position as long as the pin 60 traverses the first cam track 58, and its shape maintains the pivoting arm 56 in its pivoted position, holding the piston 50 stationary relative to its cylinder 52. Further rotation of the turntable 12 moves the mold 16 to the intermediate station 20a (see FIG. 1), and the pin 60 moves free of the first cam track 58. The weight of the carriage 38 is all the while exerting a force on the piston 44. The pivoting arm 56 is no longer constrained, however, by interaction between the cam follower (pin 60) and the cam track 58.

The weight of the carriage 38 on the piston 44 forces hydraulic fluid from the cylinder 46 into the cylinder 52. This causes the piston 50, now unconstrained, to move outwardly away from its cylinder 52, thereby allowing the carriage 38 to slide downwardly along the ramp 40 back into the first position. Each carriage 38 in turn is moved from the lowered position to the raised position and back to the lowered position as the turntable 12 rotates and the carriages 38 pass through the first station 18 (and, if desired, through the last station 22).

As each carriage 38 enters the last station 22, the molds 16 mounted on the carriage 38 are opened to release the molded containers 100. Each mold 16 then moves in turn to the first station 18 in the open configuration (see FIG. 2) to receive the next parison 31. Opening and closing of the molds 16 is further described in detail by International Application No. PCT/US2008/081932. The guide rods 68 and 70 facilitate movement of the mold halves 16a and 16b between the open and closed positions. The machine 10 also includes the takeout device 32, which is further shown and described in detail by International Application No. PCT/US2008/081932.

As thus far described and illustrated, the machine 10 of the present invention includes a neck calibrated wheel or turntable 12. The molds 16 must stop at the first station 18 to receive the parison 31. Therefore, the wheel or turntable 12 must index from station to station, placing each mold 16 in succession in a stationary position at the first station 18. The continuous start-and-stop, or indexing, of the wheel from station-to-station reduces cycle time and induces stress on the components of the machine 10. The present invention addresses these (and other) drawbacks because it avoids indexing and allows the turntable 12 to rotate continuously, without stopping, around an endless circle.

Figure 8:
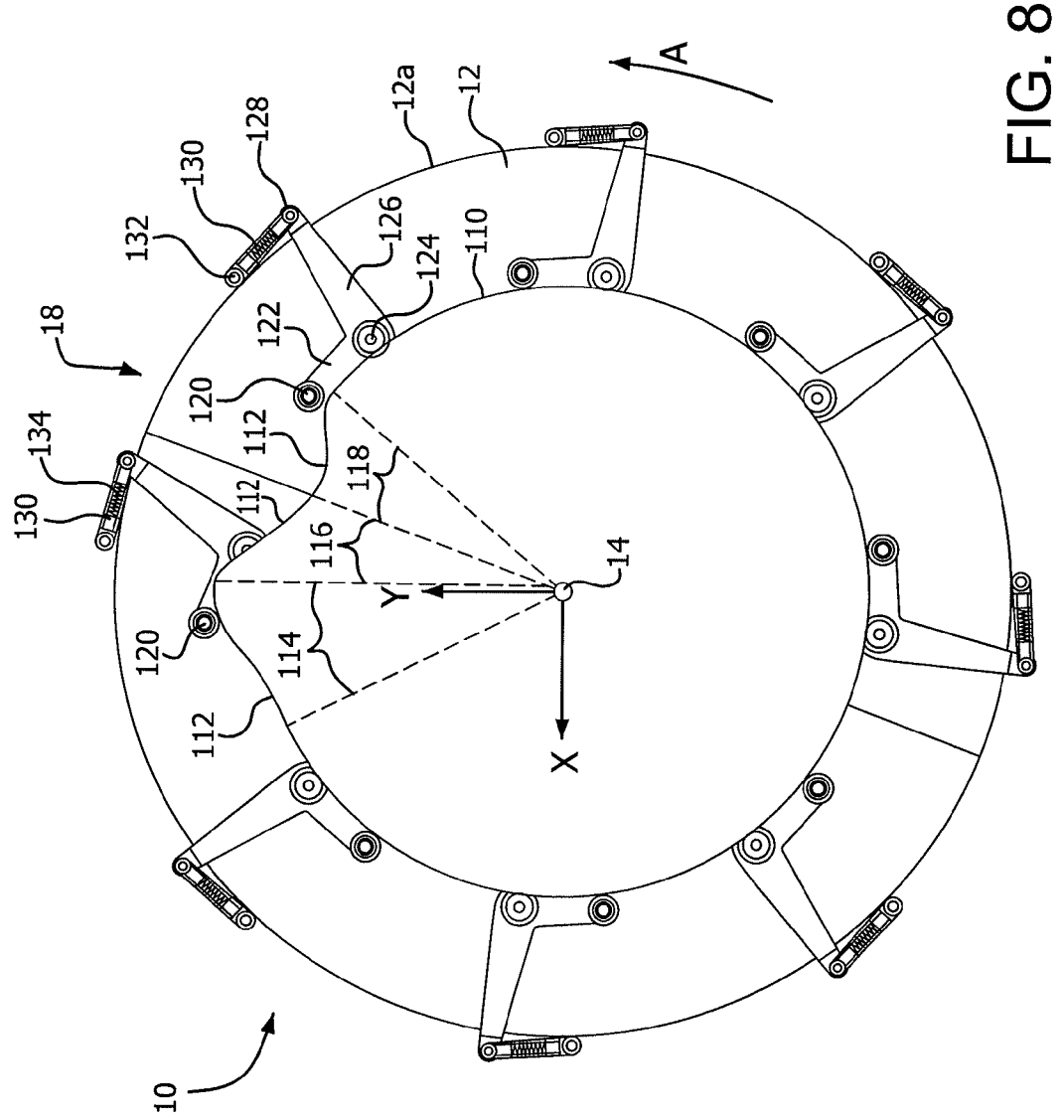
FIG. 8 is a bottom view of the turntable, including the second cam track, used on the machine in accordance with another embodiment of the present invention.
Figure 9:
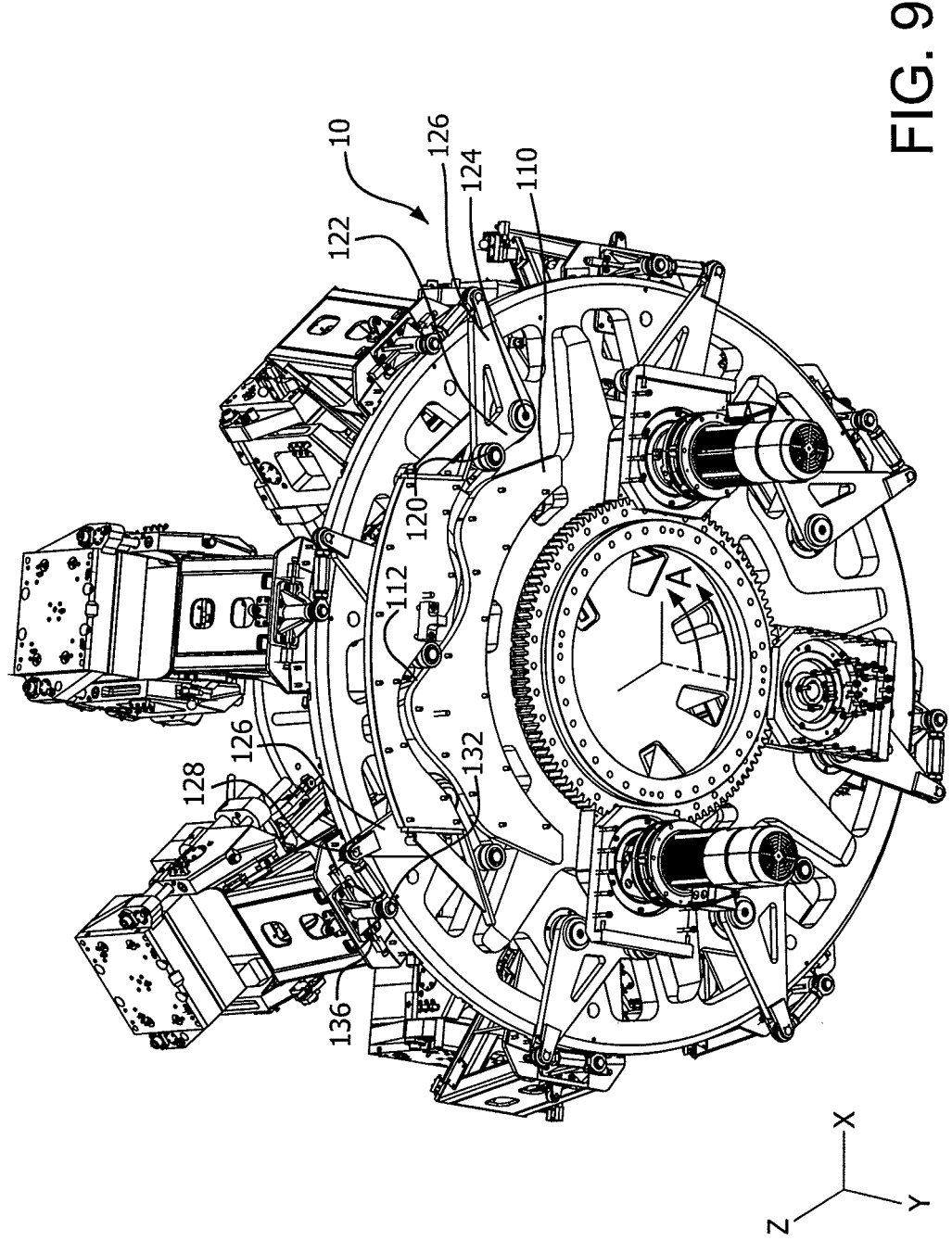
FIG. 9 is a bottom perspective view of an alternative design of the second cam track.

FIGS. 8 and 9 show two of the many possible designs of a second (or dwell) cam mechanism that allows the turntable 12 to rotate continuously while having the molds 16 pause under the flow head 26. FIG. 8 is a bottom view of the turntable 12, which has a second cam track 110, used on the machine 10. FIG. 9 is a bottom perspective view of an alternative design of the second cam track 110. The second cam mechanism is in addition to, and is provided in combination with, the first cam track 58 and its related components which function to move the carriage 38 radially inward and outward to receive the parison 31.

Turning first to the second cam track 110 illustrated in FIG. 8, the second cam track 110 has several undulations 112. The undulations 112 divide the second cam track 110 into three separate segments: a first segment 114, a substantially straight second segment 116, and a third segment 118. A plurality of second cam followers 120 (one for each station 18, 20a, 20b, 20c, 20d, 20e, 20f, 22) travel along and are directed by the second cam track 110.

The second cam follower 120 is rigidly connected by a connection leg 122 to a pivot wheel 124 fixed to the turntable 12. The pivot wheel 124 is pivotally connected, in turn, to one end 128 of a connector 130 by a rigid drive leg 126. The end of the connector 130 opposite the end 128 has a bearing 132 which contacts and travels along the circumference 12a of the turntable 12. The bearing 132 is located at the foot of a strut 136 (see FIG. 9) connected to the inclined ramp 40. The connector 130 may include a spring 134 to buffer relative motion between the components.

The drive leg 126 drives the inclined ramp 40 and its associated carriage 38 and mold 16, as directed by the second cam follower 120, through the first station 18. As illustrated in FIG. 8, the second cam follower 120 maintains a constant, circular travel path along the second cam track 110 outside the first station 18 (where the undulations 112 are located). While the turntable 12 travels through the first station 18, however, the second cam follower 120 engages the undulations 112 of the second cam track 110 and allows the second cam mechanism to stop the mold 16 under the flow head 26 as follows.

The inclined ramp 40 and its associated carriage 38 and mold 16 assume a constant, fixed position relative to the turntable 12 as the turntable 12 rotates through each of the stations 20a, 20b, 20c, 20d, 20e, 20f, and 22 other than the first station 18. As a first motion, when the inclined ramp 40 and its associated carriage 38 and mold 16 approach the first station 18, the second cam mechanism causes the inclined ramp 40 and its associated carriage 38 and mold 16 to accelerate (i.e., move faster than the rotation of the turntable 12). Such acceleration occurs when the second cam follower 120 travels through the first segment 114 of the second cam track 110. This first acceleration motion places the inclined ramp 40 and its associated carriage 38 and mold 16 in position under the flow head 26 ahead of the constantly rotating turntable 12 (more specifically, ahead of the otherwise constant, fixed position of the inclined ramp 40 and its associated carriage 38 and mold 16 relative to the turntable 12). The first acceleration motion maximizes the time allowed for the mold 16 to dwell under the flow head 26. The dwell time is typically on the order of 0.2 to 0.5 seconds, and preferably 0.3 to 0.4 seconds.

The inclined ramp 40 and its associated carriage 38 and mold 16 remain stationary, in position under the flow head 26 to receive the parison 31, while the turntable 12 continues to rotate. The inclined ramp 40 and its associated carriage 38 and mold 16 remain stationary while the second cam follower 120 travels along the substantially straight second segment 116 of the undulations 112. Thus, the inclined ramp 40 and its associated carriage 38 and mold 16 dwell under the flow head 26 while avoiding the need to stop the turntable 12.

While the inclined ramp 40 and its associated carriage 38 and mold 16 dwell (i.e., remain stationary) in position under the flow head 26 to receive the parison 31, the turntable 12 continues to rotate. Such continued rotation of the turntable 12 causes the inclined ramp 40 and its associated carriage 38 and mold 16 to lag behind their otherwise constant, fixed position relative to the turntable 12. As a final motion of the second cam mechanism, when the inclined ramp 40 and its associated carriage 38 and mold 16 exit the first station 18, the second cam mechanism causes the inclined ramp 40 and its associated carriage 38 and mold 16 to accelerate (i.e., move faster than the rotation of the turntable 12). Such acceleration occurs when the second cam follower 120 travels through the third segment 118 of the second cam track 110. This final acceleration motion places the inclined ramp 40 and its associated carriage 38 and mold 16 at their constant, fixed position relative to the turntable 12.

This final acceleration motion also provides room for the following inclined ramp 40 and its associated carriage 38 and mold 16 to approach the first station 18. For a short period of time, a lead inclined ramp 40 (and its associated carriage 38 and mold 16) and a trail inclined ramp 40 (and its associated carriage 38 and mold 16) are both moving. The lead inclined ramp 40 is completing its final acceleration to assure spacing between the lead inclined ramp 40 and the trail inclined ramp 40. Simultaneously, the trail inclined ramp 40 is completing its first acceleration motion to get ahead of the rotating turntable 12 and assure a maximum dwell time.

Various modifications are possible for the second cam mechanism. Such modifications would be known to those skilled in the art. Rather than placing the bearing 132 of the connector 130 against the circumference 12a of the turntable 12, for example, a separate channel could be cut into the turntable 12 to provide a track along which the bearing 132 could travel. In this embodiment, the bearing 132 would accelerate to the left-most point of the channel as the second cam follower 120 travels through the first segment 114 of the second cam track 110. The bearing 132 would move the entire length of the channel to the right-most point of the channel as the second cam follower 120 travels through the second segment 116 of the second cam track 110. Finally, the bearing 132 would accelerate to the center of the channel as the second cam follower 120 travels through the third segment 118 of the second cam track 110.

It is important to coordinate the timing between the movements of the first cam mechanism and the second cam mechanism. Both mechanisms begin operation at about the same time. It is important that the mold 16 reaches the top of the inclined ramp 40 and, therefore, is in position to receive the parison 31 when the inclined ramp 40 begins to dwell under the flow head 26. As detailed above, movement of the mold 16 along the inclined ramp 40 is controlled by the first cam mechanism; movement of the inclined ramp 40 into its dwell position is controlled by the second cam mechanism. Thus, the mold 16 captures the parison 31 under the flow head 26 by having the inclined ramp 40 dwell in the first station 18 only, while the turntable 12 rotates constantly at a substantially steady state.

Conventional indexing machines can achieve a speed of about 4-5 rev/min and require relatively powerful motors (i.e., about 50 horsepower; one horsepower for rating electric motors is equal to 746 watts) for indexing of the entire turntable 12 to overcome inertia. The continuous motion machine 10 of the present invention can achieve speeds of 6 rev/min or more, an increase of 17% or more. The continuous motion machine 10 uses two motors of about 4 HP each, providing a significant power savings. The power savings, the use of less complex components, and the reduction in wear on those components caused by indexing—all decrease the cost of the continuous motion machine 10.

Operation of the various elements of the machine 10 such as rotating the turntable 12, opening and closing the molds 16, raising and lowering the carriages 38, accelerating the inclined ramps 40 and their associated carriages 38 and molds 16, and moving the transfer device 32 are controlled and coordinated by a control system 75 shown in FIG. 1. The control system 75 is preferably a microprocessor-based device such as a personal computer or a programmable logic controller which executes resident software controlling the functional operation of the machine 10. Communication between the various machine elements and the control system 75 may be by wire, by wireless, or by a combination of both wire and wireless communications. Wireless communications are especially advantageous for controlling components on rotating machinery, such as the turntable 12, because these communications avoid the need for complex rotary contacts to transmit electrical signals across rotary interfaces where components are moving relative to one another. Feedback to the control system 75 is provided by various sensors such as micro switches and optical sensors deployed and positioned as required to provide positional information and other status-related information.

According to another embodiment of the present invention, the formed containers 100 are held beyond the 315 degrees of machine rotation that is typical between the first station 18 (at which the molds 16 receive the parison 31) and the last station 22 (at which the formed containers 100 are removed by the takeout device 32). The typical configuration is illustrated in FIG. 1. As an improvement, the formed containers 100 are retained by the machine 10 beyond the initial 360 degrees first tour of rotation and up to a total rotation of 675 degrees (or at least less than 720 degrees). Of course, as an artisan would understand, the angular values are provided for the example eight station machine 10 illustrated; the values would be adjusted were the machine 10 to have greater, or fewer, than eight stations.

The additional time during which the containers 100 are retained on the machine 10 allows added features to be realized. Example features will be discussed below. First, however, the "second tour" embodiment—which permits the machine 10 to retain the fully formed containers 100 beyond the initial 360 degrees first tour of rotation—is described with reference to operation of the machine 10. The operation of the machine 10 is described from the perspective of a particular mold 16 and with reference to FIGS. 10-14.

At Position #1, 0 degrees, the mold 16 is at the first station 18. One of the inclined ramps 40 and its associated carriage 38 have been rotated on the turntable 12 to the first station 18 with the mold 16 mounted on the carriage 38. The mold 16 is in the open configuration and is positioned under the flow head 26. The second cam mechanism causes the mold 16 to dwell under the flow head 26 (while the turntable 12 continues to rotate). The extruder 24 provides molten polymer resin to the flow head 26 which produces the continuous parison 31. The carriage 38 is in the raised position on the inclined ramp 40 so that the mold portions 16a and 16b surround the parison 31. An actuator then closes the mold portions 16a and 16b, ensuring proper closure of the mold 16. A clamping force is then exerted on the mold portions 16a and 16b to lock the mold 16 in its closed position. The cutter 34 and the pinch clamp 36 operate to sever a parison portion from the parison 31 and seal the parison 31 so that it can be partially inflated to prevent it from collapsing and adhering to itself.

During the transit of the mold 16 to Position #2, the inclined ramp 40 and its associated carriage 38 and mold 16 accelerate (relative to the turntable 12) to "catch up" with the turntable 12 and return to their constant, fixed position relative to the turntable 12 (i.e., to the blow position). The clamping forces are being applied during this transition. While transiting from the first station 18 to the intermediate second station 20a, the cam follower pin 60 exits the cam track 58 and the carriage 38 slides down the inclined ramp 40 under its own weight. The turntable 12 rotates the carriage 38 and its associated mold 16 to the second station 20a where one or more blow pins 30 are lowered into engagement with the parison 31. The application of clamping forces, lowering of the carriage 38, and insertion of the blow pins 30 may occur substantially simultaneously.

At Position #2, 45 degrees, the mold 16 is at the intermediate station 20a. The carriage 38 is positioned at the bottom of the inclined ramp 40 (i.e., the first cam mechanism is inactive). The inclined ramp 40 and its associated carriage 38 and mold 16 are positioned at their constant, fixed position relative to the turntable 12 (i.e., the second cam mechanism is inactive). One or more blow pins 30 are lowered into engagement with the parison 31 to create the calibrated neck and to inject compressed air into the interior of the parison 31 and force the parison 31 to conform to the shape of the mold 16. The blow pins 30 are also able to hold the container 100 formed by the parison 31.

At Position #3, 90 degrees, the mold 16 is at the intermediate station 20b. At Position #4, 135 degrees, the mold 16 is at the intermediate station 20c. At Position #5, 180 degrees, the mold 16 is at the intermediate station 20d. At Position #6, 225 degrees, the mold 16 is at the intermediate station 20e. At Position #7, 270 degrees, the mold 16 is at the intermediate station 20f. During the transition from Position #3 to Position #7, the container 100 is completely blown and then cooled. The particular application dictates precisely when blowing stops and cooling begins. The turntable 12 moves the mold 16 in turn to each of the intermediate stations 20b through 20f. The carriage 38 is positioned at the bottom of the inclined ramp 40 (i.e., the first cam mechanism is inactive). The inclined ramp 40 and its associated carriage 38 and mold 16 are positioned at their constant, fixed position relative to the turntable 12 (i.e., the second cam mechanism is inactive).

Once the mold 16 reaches the intermediate station 20f for the machine 10 operating without the "second tour" embodiment of the present invention now being described, the blow pins 30 disengage from the container 100 and the mold 16 is moved to the last station 22. At the last station 22, the transfer device 32 engages the container 100 still in the closed mold 16. (The cam follower pin 60 may or may not engage the cam track 58 and operate the actuators 48 and 42 to raise the carriage 38 upwardly along the ramp 40 at the last station 22; the position of the mold 16 relative to the transfer device 32 is a matter of design choice.) Actuators open the mold 16 to release the container 100. Upon opening the mold 16, the transfer device 32 removes the container 100 from the mold 16. Once the container 100 is clear of the mold 16, the turntable 12 moves the open mold 16 back to the first station 18 to repeat the process. The last station 22 is typically the takeout station because it is advantageous to have the mold 16 closed as long as possible, allowing for maximum cooling time.

Figure 10:
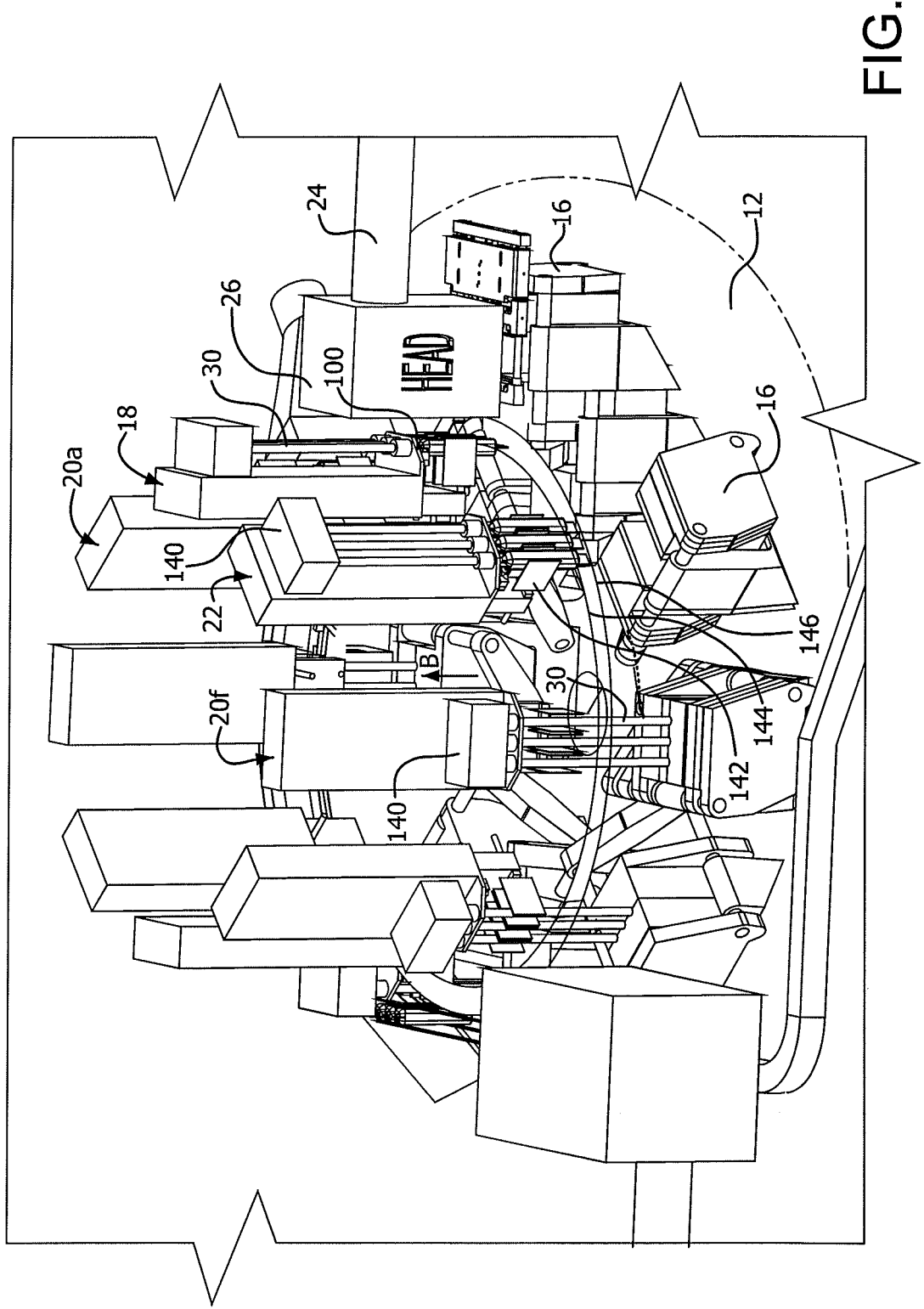
FIG. 10 is a perspective view illustrating the second-tour embodiment according to the present invention.

For the machine 10 operating with the "second tour" embodiment, however, as shown in FIG. 10, the blow pins 30 remain in the containers 100 at the intermediate station 20*f* (Position #7). During the transit of the mold 16 to Position #8, 315 degrees, the mold 16 opens and a lifter 140 extracts the blow pins 30 from the mold 16. Specifically, the lifter 140 raises the blow pins 30, which carry the formed containers 100, upward and out of the mold 16. (Compare the last station 22 to the intermediate station 20*f* in FIG. 10.) At Position #8, the mold 16 is at the last station 22. At Position #8, a set of paddles 142 grip the containers 100 and prepare to strip the containers 100 from the blow pins 30.

During the transit of the mold 16 from Position #8 to Position #1 (i.e., from the last station 22 to the first station 18), the inclined ramp 40 and its associated carriage 38 and mold 16 accelerate (relative to the turntable 12) to move ahead of the turntable 12 (i.e., the second cam mechanism is actuated). The cam follower pin 60 engages the cam track 58 and the carriage 38 moves up the inclined ramp 40 (i.e., the first cam mechanism is actuated). The turntable 12 rotates the inclined ramp 40 with its associated carriage 38 and the mold 16 to the first station 18 where the mold 16 is once again located under the flow head 26 and ready to receive a new parison 31.

Meanwhile, as the mold 16 transits from Position #8 to Position #1 to begin a new cycle of forming another container 100, the blow pins 30 remain in the formed containers 100 and the paddles 142 continue to grip the formed containers 100. The blow pins 30 have now traveled a complete, 360-degrees tour or cycle around the machine 10 along a circular blow pin path 144. With continued rotation of the turntable 12, the blow pins 30, the paddles 142, and the formed containers 100 pass the flow head 26 at the first station 18 (as shown in FIG. 10). Once past the flow head 26, and in transit to Position #2, the blow pins 30 are removed from the formed containers 100 and the paddles 142 push the formed containers 100 radially outward past the blow pin path 144 to a container path 146. Thus free, the blow pins 30 can be lowered into the parisons 30 to blow new containers 100 during the next traverse around the blow pin path 144.

Like the blow pin path 144, the container path 146 is circular. The container path 146 is located radially outward from the blow pin path 144. Thus, the blow pin path 144 is located closer to the axis of rotation 14 at the center of the turntable 12 than is the container path 146. Also noteworthy, when comparing the two paths, is that the formed containers 100 travel along the container path 146 above the molds 16 carrying parisons 31 into which the blow pins 30 have been inserted as the blow pins 30 travel along the blow pin path 144.

Figure 11:
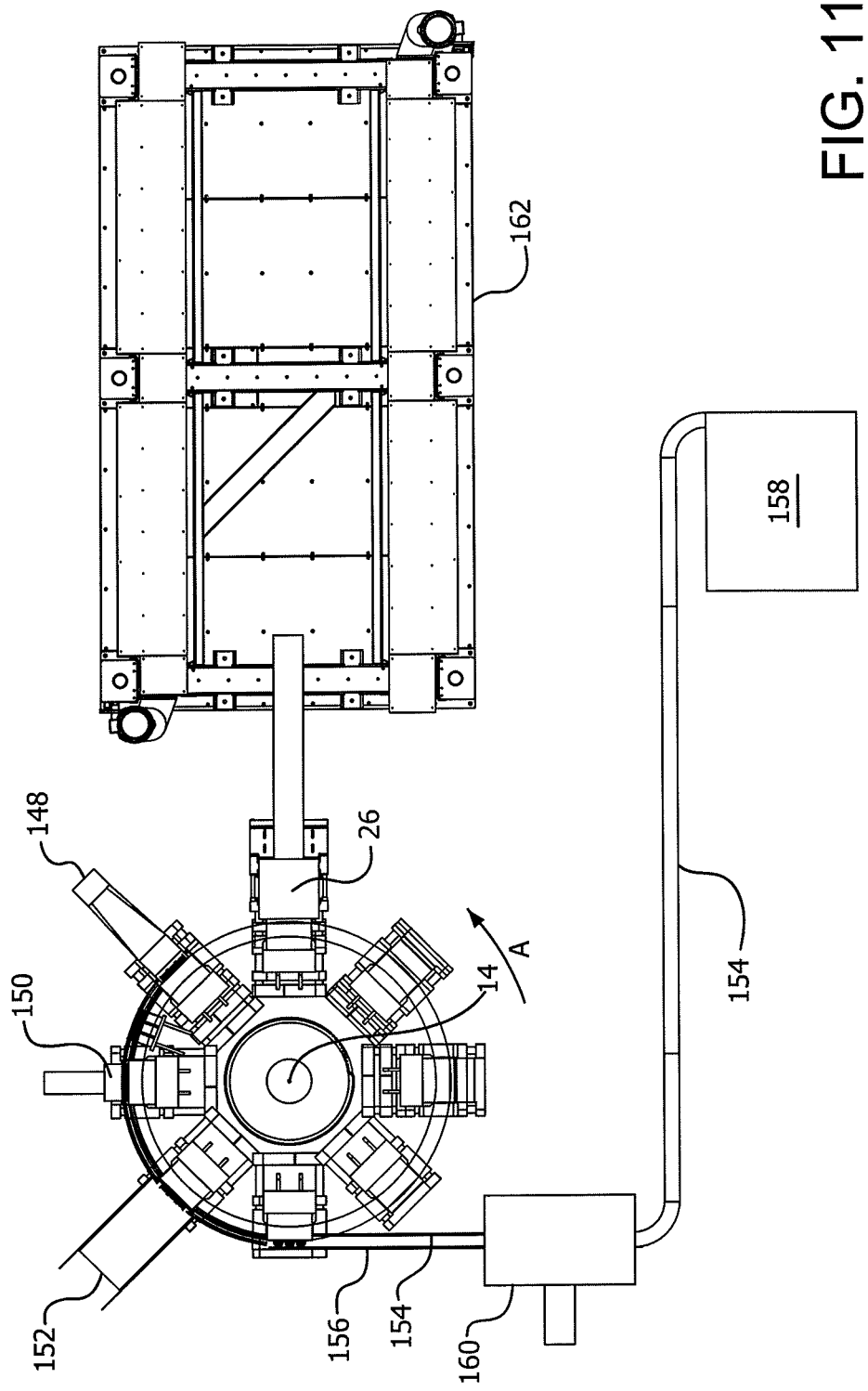
FIG. 11 is a schematic plan view illustrating some of the example features that are made possible by the second-tour embodiment shown in FIG. 10.
Figure 12:
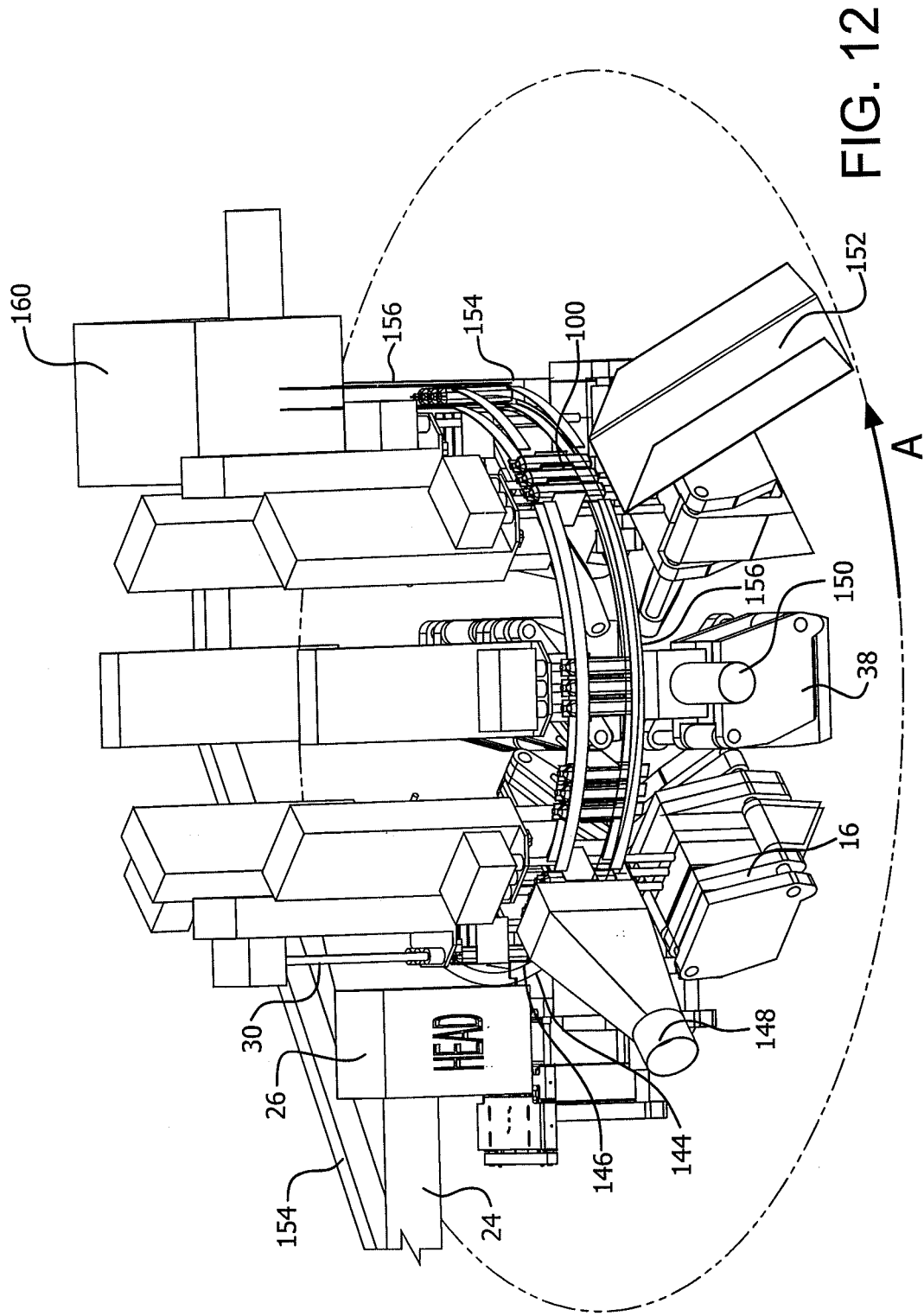
FIG. 12 is a first perspective view illustrating some of the same features shown schematically in FIG. 11.
Figure 13:
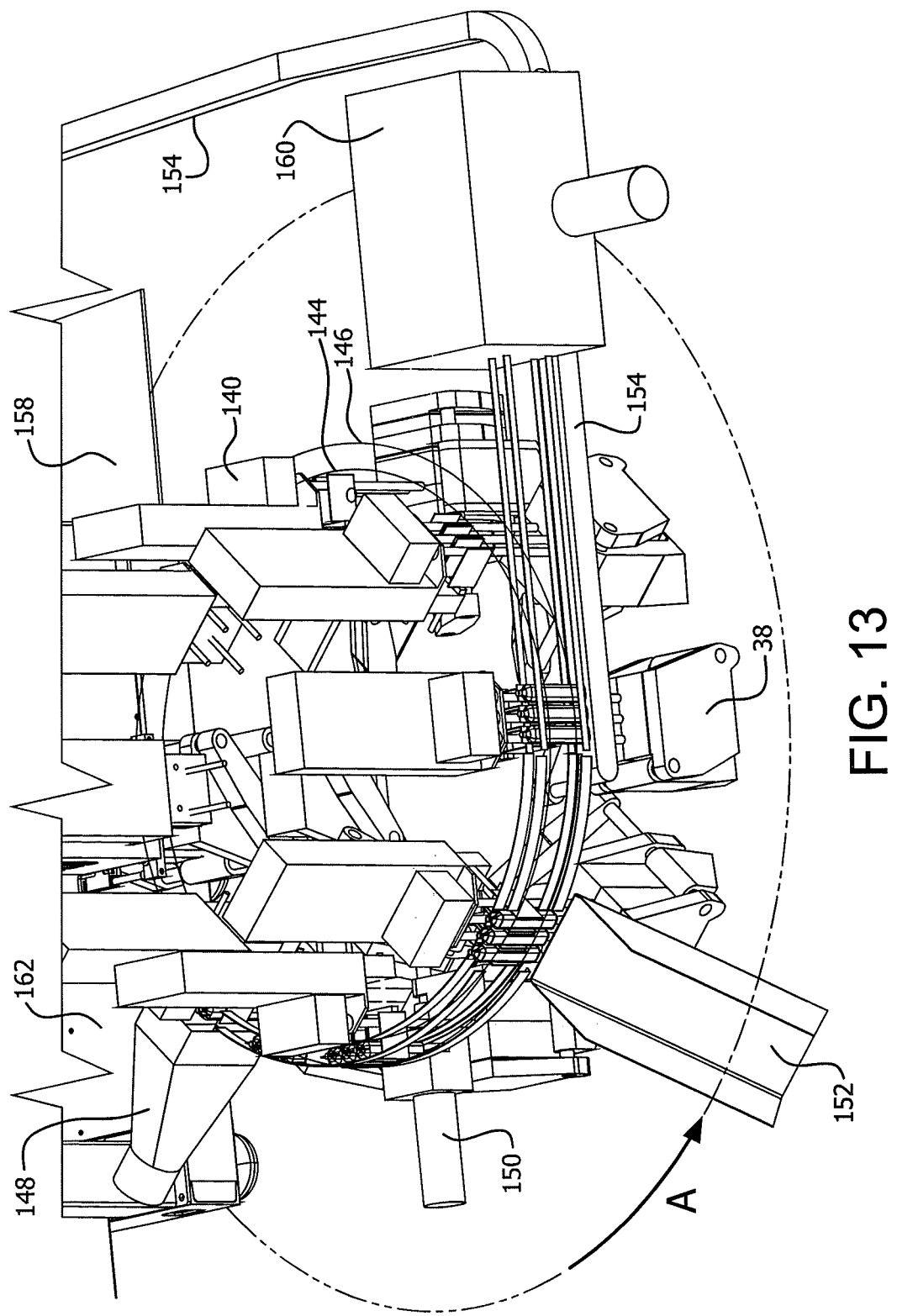
FIG. 13 is a second perspective view, from a different vantage than that of FIG. 12, illustrating some of the same features shown schematically in FIG. 11.

Focusing now on the container path 146, FIG. 11 provides a schematic plan view illustrating some of the example features that are made possible by the "second tour" embodiment. FIG. 12 is a first perspective view, and FIG. 13 is a second perspective view from a different vantage, illustrating some of the same features shown schematically in FIG. 11. At Position #2, 405 degrees, a vacuum 148 is positioned. At Position #2, the formed containers 100 are at the intermediate second station 20*a*. The vacuum 148 allows the formed container 100 to be rejected (e.g., for failing to meet quality criteria) and removed from the machine 10, thereby separating the rejected container 100 from mainstream production.

At Position #3, 450 degrees, a first (down) de-flasher 150 is positioned. At Position #3, the formed containers 100 are at the intermediate station 20*b*. The first de-flasher 150 removes unwanted flash from the bottom of the formed container 100. Such flash removal assures that the container 100 has a substantially flat bottom surface and, therefore, can lie flat and ride on a conventional conveyor.

At Position #4, 495 degrees, the formed containers 100 are at the intermediate station 20*c*. At Position #5, 540 degrees, the formed containers 100 are at the intermediate station 20*d*. At Position #6, 585 degrees, the formed containers 100 are at the intermediate station 20*e*. A wide variety of additional features can be added, as desired for a particular application, at any of Positions #4-6 (as well as at Positions #2 and 3). Such features might include, for example and among others, a leak detection unit, for detecting containers 100 that exhibit leaks and warrant rejection, and a labeling device for affixing labels to the containers 100.

These additional features perform operations on the just-formed containers 100 and are added to the machine 10 proximate the container path 146. The operations are "extra" in the sense that they occur after the basic operations necessary to blow-mold and cool the containers 100, which occur proximate the blow pin path 144. The additional features are added to the machine 10 without introducing significant costs or requiring floor space when compared to conventional blow-molding machines that might incorporate the features on their respective downstream lines. The additional features avoid the need for further processing of the containers 100 after the containers 100 leave the machine 10. Thus, the machine 10 completes the entire process of forming and finishing the containers 100 so that the containers 100 leave the machine 10 ready to ship to a customer.

By Position #7, 630 degrees, however, the formed containers 100 must be removed from the turntable 12. Position #7 corresponds to the intermediate station 20*f*. Removal of the formed containers 100 must be completed by Position #7 so that the paddles 142 are free to retract inward (away from the container path 146) and return to a position in the blow pin path 144, where the paddles 142 engage a new set of just-formed containers 100 and begin another cycle.

As illustrated in FIGS. 11 and 12, a chute 152 is shown at Position #4. The chute 152 is available to remove containers 100 from the turntable 12. The removed containers 100 may be rejects or a first type of properly formed container 100 that must be separated from the mainstream containers 100. Alternatively, the chute 152 may constitute the takeout mechanism for all of the containers 100.

As also illustrated in FIGS. 11 and 12, a conveyor 154 is shown at Position #5. A set of guides 156 help to direct the containers 100, which are held by the paddles 142, onto the conveyor 154. Once the containers 100 are safely placed on the conveyor 154, the paddles 142 retract and are free to engage new containers 100. The conveyor 154 transports the containers 100 to, for example, a packing table 158 where the containers 100 are packed for further transportation. The conveyor 154 may carry the containers 100 through a second (up) de-flasher 160. The second de-flasher 160 removes unwanted flash from the top of the formed container 100. Thus, whether they interact with one or more of the vacuum 148, the chute 152, or the conveyor 154 and the guides 156, the paddles 142 provide a handling mechanism for removing the containers 100 from the machine 10 which is gentle and will not damage the containers 100 when they are most vulnerable during cooling. Also shown in FIG. 11 is a car lift 162, which operates according to principles known to an artisan.

Figure 14:
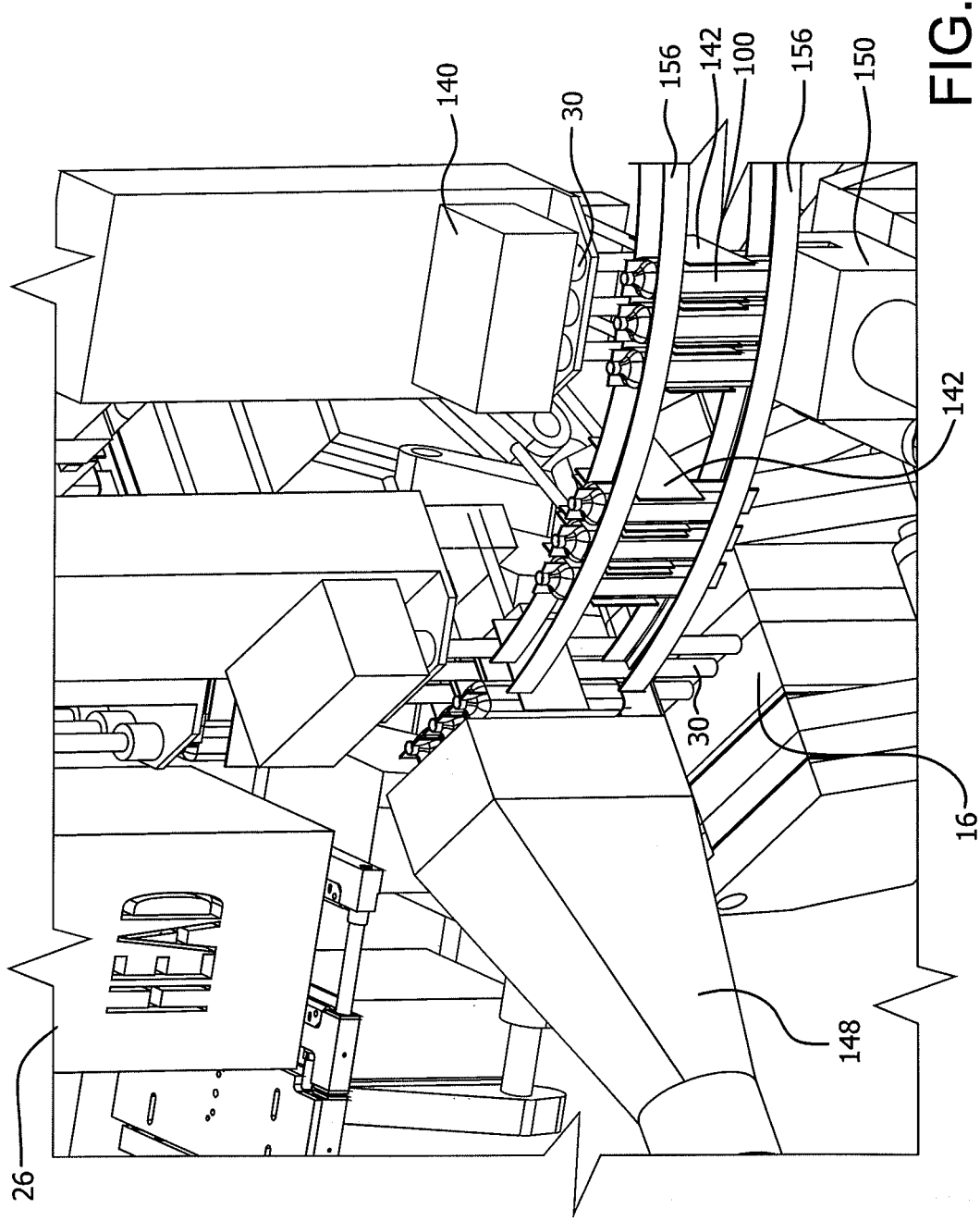
FIG. 14 is an exploded view highlighting the relationship between the blow pin path and the container path.

FIG. 14 is an exploded view highlighting the relationship between the inner blow pin path 144 and the outer container path 146. The blow pins 30 are shown traveling along the blow pin path 144. The fully formed containers 100 are shown o traveling along the container path 146.

It is understood that the events described above occur in turn for each mold 16 one after another as dictated by the control system 75. It is also noted that it is possible to position a parison 31 in certain molds 16, to the exclusion of other molds 16, or to permit different molds 16 to be mounted on the turntable 12. This flexibility avoids costly downtime when switching production from one type of container 100 to another. Thus, the machine 10 according to the invention may have a plurality of different types of molds 16 for molding different types of containers 100. For example, the plurality of molds 16 may include a group of first molds 16' for molding a first container 100' and a group of second molds 16" for molding a second container 100". In this embodiment, it is advantageous that each of the first molds 16' is positioned on one of the carriages 38' adjacent to a carriage 38" carrying one of the second molds 16" in an alternating sequence.

As described above and illustrated in FIGS. 1-14, the improved blow-molding machine 10 according to the invention economically manufactures a variety of containers 100 in a continuous blow-molding process. The machine 10 provides several advantages over conventional devices. Among those advantages are the use of a stationary flow head 26, which reduces the potential for container defects and irregularities due to pendulum motion of the parison 31 as it is extruded. The added container cooling time afforded by the machine 10 ensures that containers 100 are sufficiently cured so that they may be handled without fear of damage upon removal from the mold 16. Furthermore, using paddles 142 to physically handle the containers 100 after the containers 100 are released from the mold 16 helps to avoid damage, especially to the container neck region, which must maintain close tolerances for receiving spouts and sealing covers. In addition, positioning different molds 16 on the carriages 38 in an alternating or other sequence helps reduce machine down time by avoiding costly changeovers swapping molds 16, and thereby increases productivity.

Although illustrated and described above with reference to certain specific embodiments and examples, the present invention is nevertheless not intended to be limited to the details shown. Rather, various modifications may be made in the details o within the scope and range of equivalents of the claims and without departing from the spirit of the invention.

What is claimed is:

1. A machine for blow-molding containers from a parison, the machine comprising:
 a turntable continuously rotating about an axis of rotation in an endless circle without stopping;
 a flow head forming and providing the parison and being fixedly positioned at a first station of the machine proximate the turntable;
 a plurality of molds carried by the turntable to position each of the molds adjacent the flow head in turn, each mold including mold portions which are movable between an open configuration to receive the parison from the flow head and a closed configuration to mold the parison; and
 a dwell cam mechanism located on the turntable and including (a) a dwell cam track having undulations that divide the dwell cam track into a first segment, a second segment, and a third segment and (b) a dwell cam follower engaging the undulations as the turntable rotates, the dwell cam follower engaging the first segment configured to cause initial acceleration of the mold, the second segment configured to stop the mold, and the third segment configured to cause final acceleration of the mold, the dwell cam mechanism initially accelerating each mold in turn from an initial location relative to the turntable as the mold approaches the first station to position the mold adjacent the flow head, stopping the mold adjacent the flow head while the mold receives the parison and the turntable continues to rotate, then finally accelerating the mold relative to the turntable as the mold leaves the first station to position the mold at its initial location relative to the turntable.

2. The machine according to claim 1, further comprising a lifting cam mechanism located on the turntable, the lifting cam mechanism moving each mold in turn radially outward relative to the axis of rotation from an initial position as the mold approaches the first station to position the mold adjacent the flow head and radially inward relative to the axis of rotation as the mold leaves the first station to return the mold to its initial position.

3. The machine according to claim 2, wherein the lifting cam mechanism positions the mold adjacent the flow head approximately when the dwell cam mechanism stops the mold adjacent the flow head.

4. The machine according to claim 2, wherein the lifting cam mechanism includes:
 a plurality of ramps mounted on the turntable, the ramps facing radially outward from the turntable; and
 a plurality of carriages, each carriage carrying a mold with one carriage mounted on each ramp and movable along the ramp between the initial mold position and a second position proximate the flow head.

5. The machine according to claim 1, further comprising a plurality of blow pins mounted on the turntable, at least one blow pin being positioned adjacent to each of the molds, the blow pins being engageable with the molds when in the closed configuration for injecting compressed gas into the molds to effect blow molding of the parison.

6. The machine according to claim 5, wherein the blow pins create a calibrated neck on the containers.

7. The machine according to claim 5, further comprising:
 paddles gripping the blow-molded containers after the containers have been blow-molded from the parisons;
 a blow pin path traveled by the blow pins while blow-molding the containers from the parisons; and
 a container path traveled by the paddles while gripping the blow-molded containers, the container path positioned radially outward from, and further from the axis of rotation than, the blow pin path.

8. The machine according to claim 7, wherein the container blow-molded from the parison received from the flow head at the first station is retained on the turntable after the turntable completes one full revolution and again passes the first station.

9. The machine according to claim 1, wherein the dwell cam mechanism stops the mold adjacent the flow head for about 0.2 to 0.5 seconds.

10. The machine according to claim 1, wherein the flow head continuously forms and provides the parison.

11. The machine according to claim 1, further comprising a control system that coordinates and controls operation of the machine.

12. The machine according to claim 1, wherein the plurality of molds include different types of molds for molding different types of containers.

13. The machine according to claim 1, wherein the plurality of molds include a group of first molds for molding a first container and a group of second molds for molding a second container.

14. The machine according to claim 1, wherein the container blow-molded from the parison received from the flow head at the first station is retained on the turntable after the turntable completes one full revolution and again passes the first station.

15. The machine according to claim 14, further comprising at least one additional, non-molding feature selected from the group consisting of a vacuum, a chute, a de-flasher, a leak-detection unit, and a labeling device, the additional feature engaging the blow-molded container after the blow-molded container has been retained on the turntable beyond one full revolution.

16. A machine for blow-molding containers from a parison, the machine comprising:
- a turntable continuously rotating about an axis of rotation in an endless circle without stopping;
- a flow head forming and providing the parison and being fixedly positioned at a first station of the machine proximate the turntable;
- a plurality of molds carried by the turntable to position each of the molds adjacent the flow head in turn, each mold including mold portions which are movable between an open configuration to receive the parison from the flow head and a closed configuration to mold the parison;
- a plurality of blow pins mounted on the turntable, at least one blow pin being positioned adjacent to each of the molds, the blow pins being engageable with the molds when in the closed configuration for injecting compressed gas into the molds to effect blow molding of the parison;
- paddles gripping the blow-molded containers after the containers have been blow-molded from the parisons;
- a blow pin path traveled by the blow pins while blow-molding the containers from the parisons; and
- a container path traveled by the paddles while gripping the blow-molded containers, the container path positioned radially outward from, and further from the axis of rotation than, the blow pin path,
- wherein the container blow-molded from the parison received from the flow head at the first station is retained on the turntable after the turntable completes one full revolution and again passes the first station.

17. A machine for blow-molding containers from a parison, the machine comprising:
- a turntable continuously rotating about an axis of rotation in an endless circle without stopping;
- a flow head forming and providing the parison and being fixedly positioned at a first station of the machine proximate the turntable; and
- a plurality of molds carried by the turntable to position each of the molds adjacent the flow head in turn, each mold including mold portions which are movable between an open configuration to receive the parison from the flow head and a closed configuration to mold the parison;
- wherein the container blow-molded from the parison received from the flow head at the first station is retained on the turntable after the turntable completes one full revolution and again passes the first station.

18. The machine according to claim 17, further comprising at least one additional, non-molding feature selected from the group consisting of a vacuum, a chute, a de-flasher, a leak-detection unit, and a labeling device, the additional feature engaging the blow-molded container after the blow-molded container has been retained on the turntable beyond one full revolution.

* * * * *